Dec. 10, 1940.   J. W. CHALMERS ET AL   2,224,779
PACKET MAKING APPARATUS
Original Filed Oct. 29, 1937   10 Sheets-Sheet 1
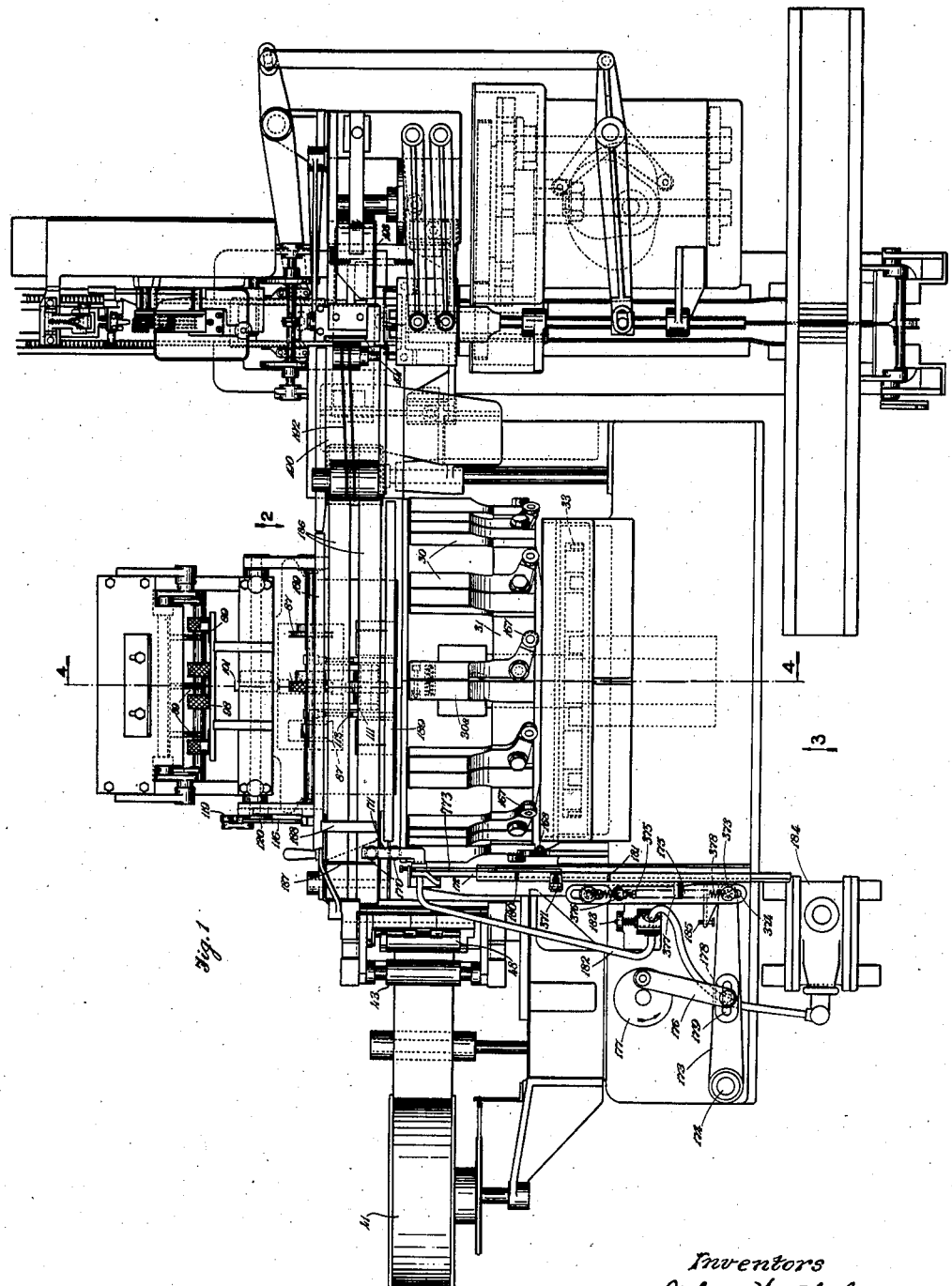

Dec. 10, 1940.   J. W. CHALMERS ET AL   2,224,779
PACKET MAKING APPARATUS
Original Filed Oct. 29, 1937   10 Sheets-Sheet 2

Inventors
John W. Chalmers
David B. Kidd
By Watson, Cole, Grindle &
Watson   Attys.

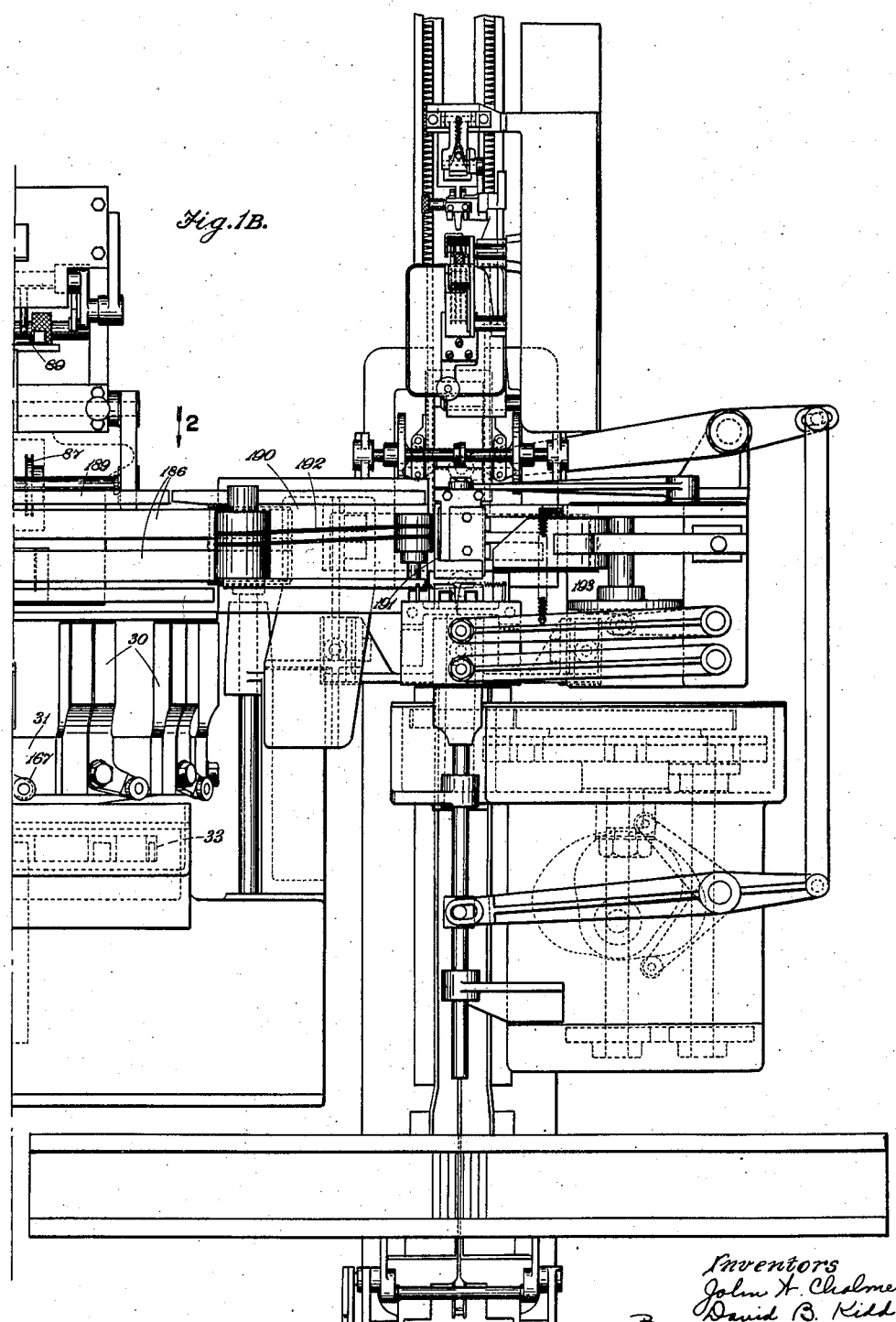

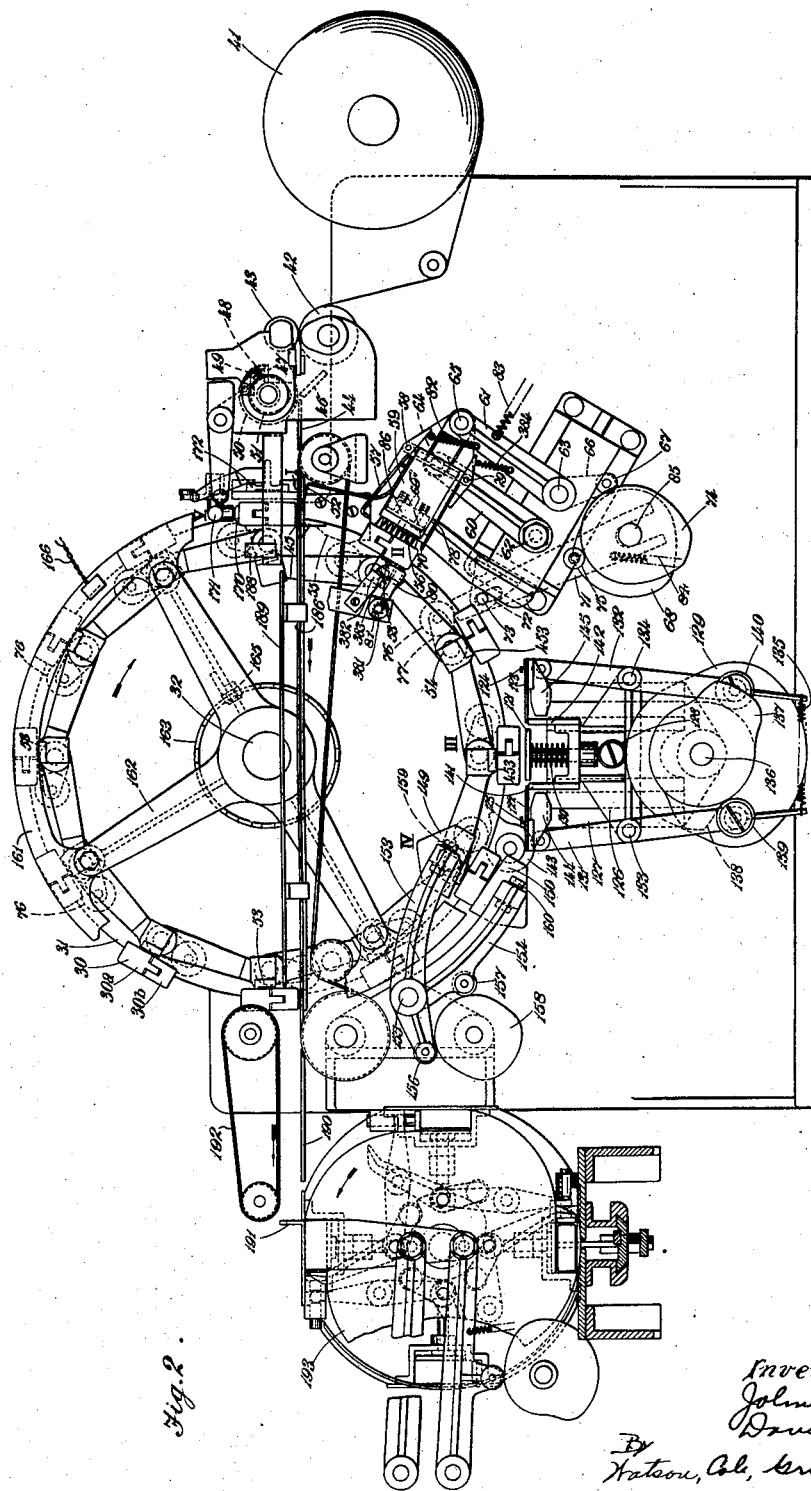

Dec. 10, 1940.  J. W. CHALMERS ET AL  2,224,779
PACKET MAKING APPARATUS
Original Filed Oct. 29, 1937   10 Sheets-Sheet 6

Inventors
John W. Chalmers
David B. Kidd
By
Watson, Cole, Grindle & Watson
Attys.

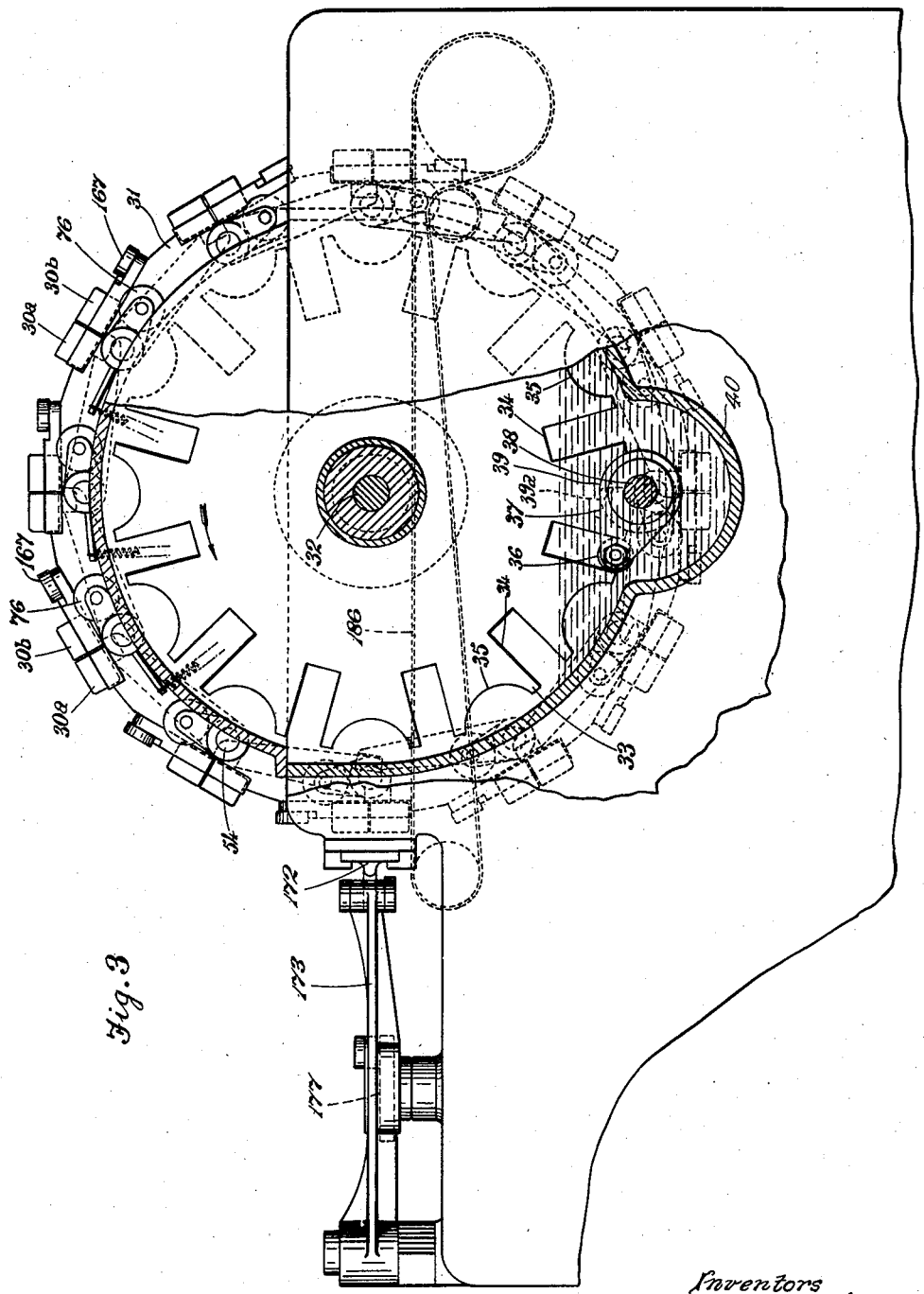

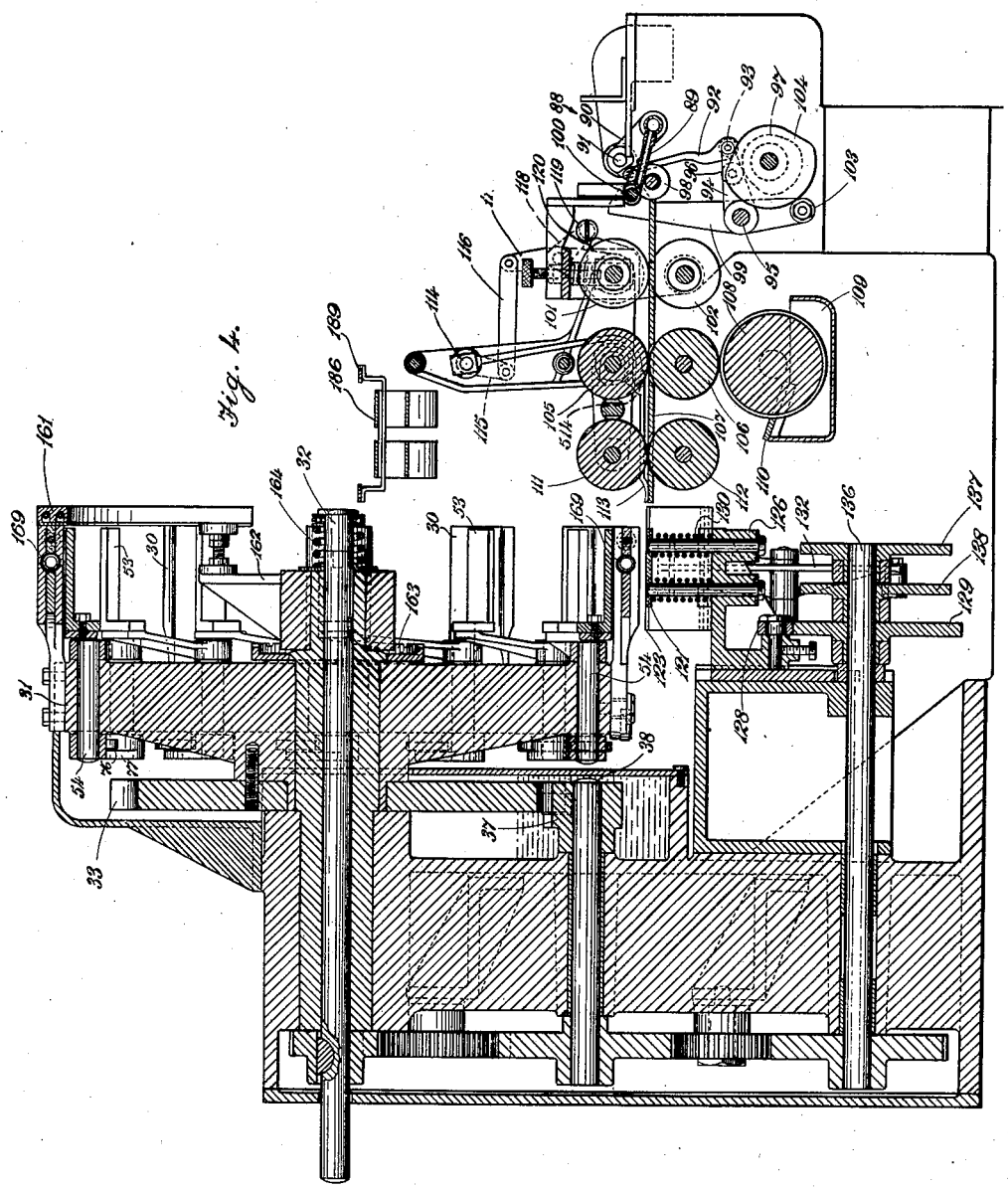

Dec. 10, 1940.　　J. W. CHALMERS ET AL　　2,224,779
PACKET MAKING APPARATUS
Original Filed Oct. 29, 1937　　10 Sheets-Sheet 9
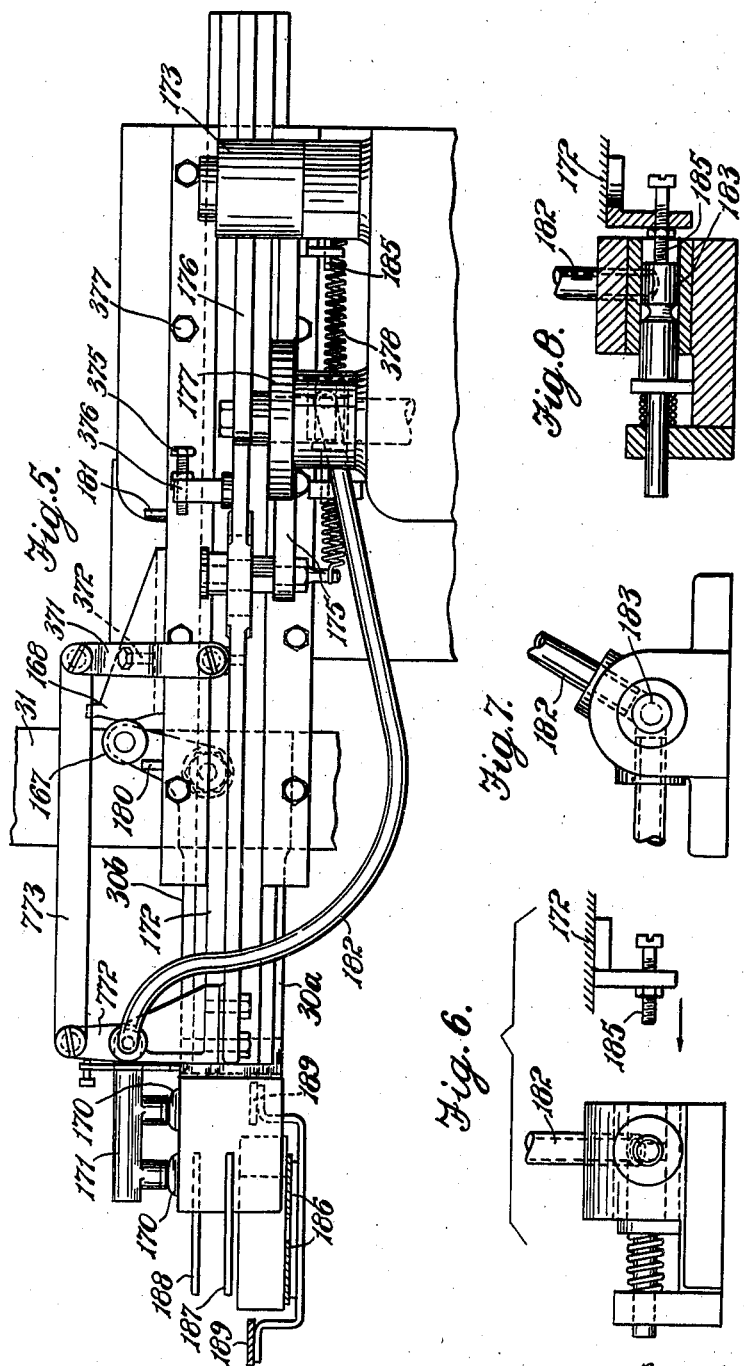

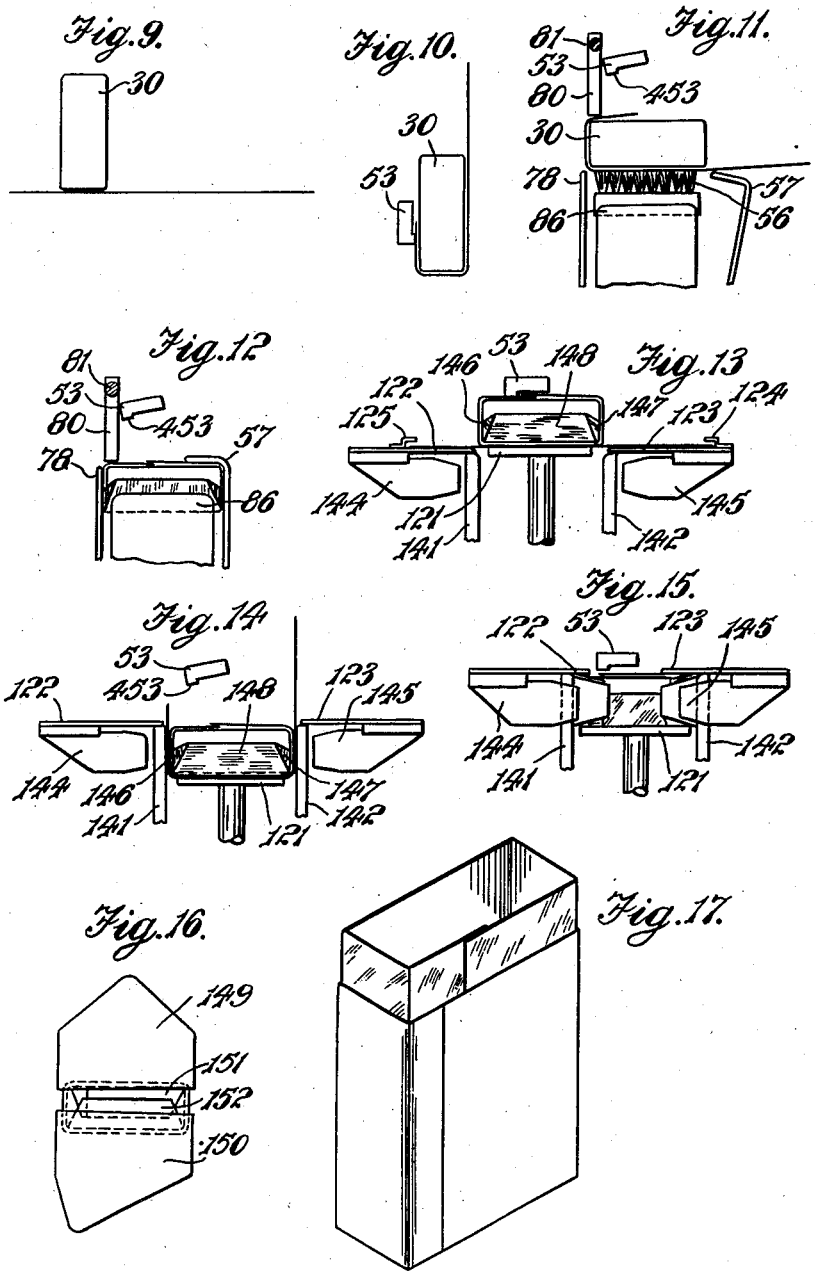

Patented Dec. 10, 1940

2,224,779

UNITED STATES PATENT OFFICE 2,224,779

PACKET MAKING APPARATUS

John Walker Chalmers and David Blewes Kidd, Deptford, London, England, assignors to Molins Machine Company, Limited, London, England Original application October 29, 1937, Serial No. 171,796. Divided and this application June 27, 1938, Serial No. 216,142. In Great Britain October 29, 1937

11 Claims. (Cl. 93—12)

This invention is for a packet making apparatus and is a division of our prior filed application Serial No. 171,796, filed October 29, 1937.

One object of the invention is to provide means whereby empty wrappers may be formed about a mandrel, the wrappers being open at one end to receive batches of cigarettes. This and other objects will be described with reference to the accompanying drawings, in which:

Figure 1 is a plan of a cigarette packing machine having a packet making apparatus connected thereto.

Figures 1a and 1b show Figure 1 drawn to an enlarged scale.

Figure 2 is an elevation looking in the direction of the arrow 2, Figure 1.

Figure 3 is an elevation of the machine looking in the direction of the arrow 3, Figure 1.

Figure 4 is a sectional elevation on the line 4—4, Figure 1.

Figure 5 is a side elevation showing mechanism for stripping formed wrappers from a mandrel.

Figure 6 shows a valve used in connection with the mechanism shown in Figure 5.

Figure 7 is a view of Figure 6 looking in the direction of the arrow 8.

Figure 8 is a sectional elevation of Figure 6, some parts being shown in different positions from those shown in Figure 6.

Figure 1A:
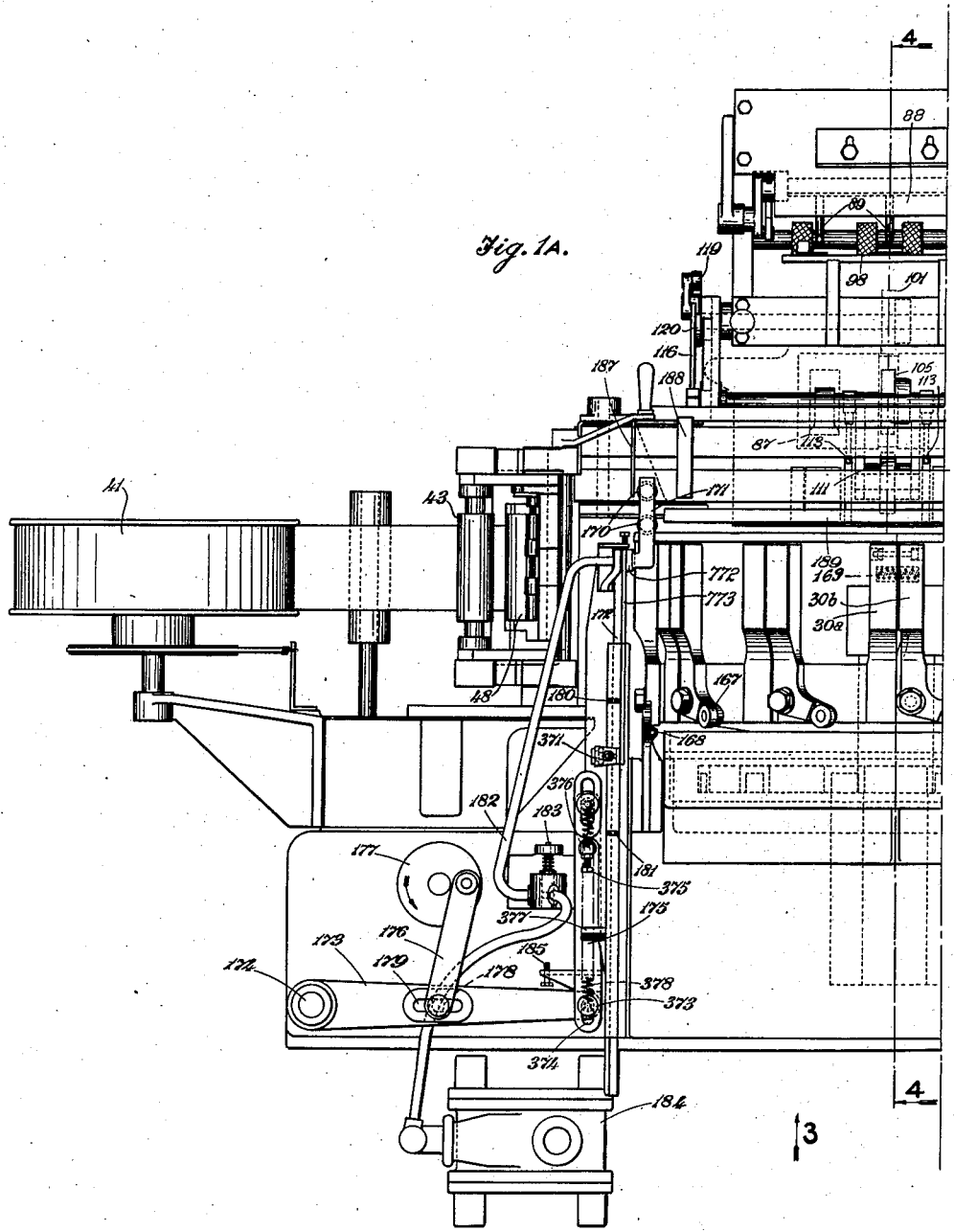

Figures 9 to 16 inclusive illustrate various successive operations during the forming of a packet.

Figure 17 is a perspective view of a finished open-ended packet.

Like reference numerals refer to like parts throughout the specification and drawings.

Figure 2A:
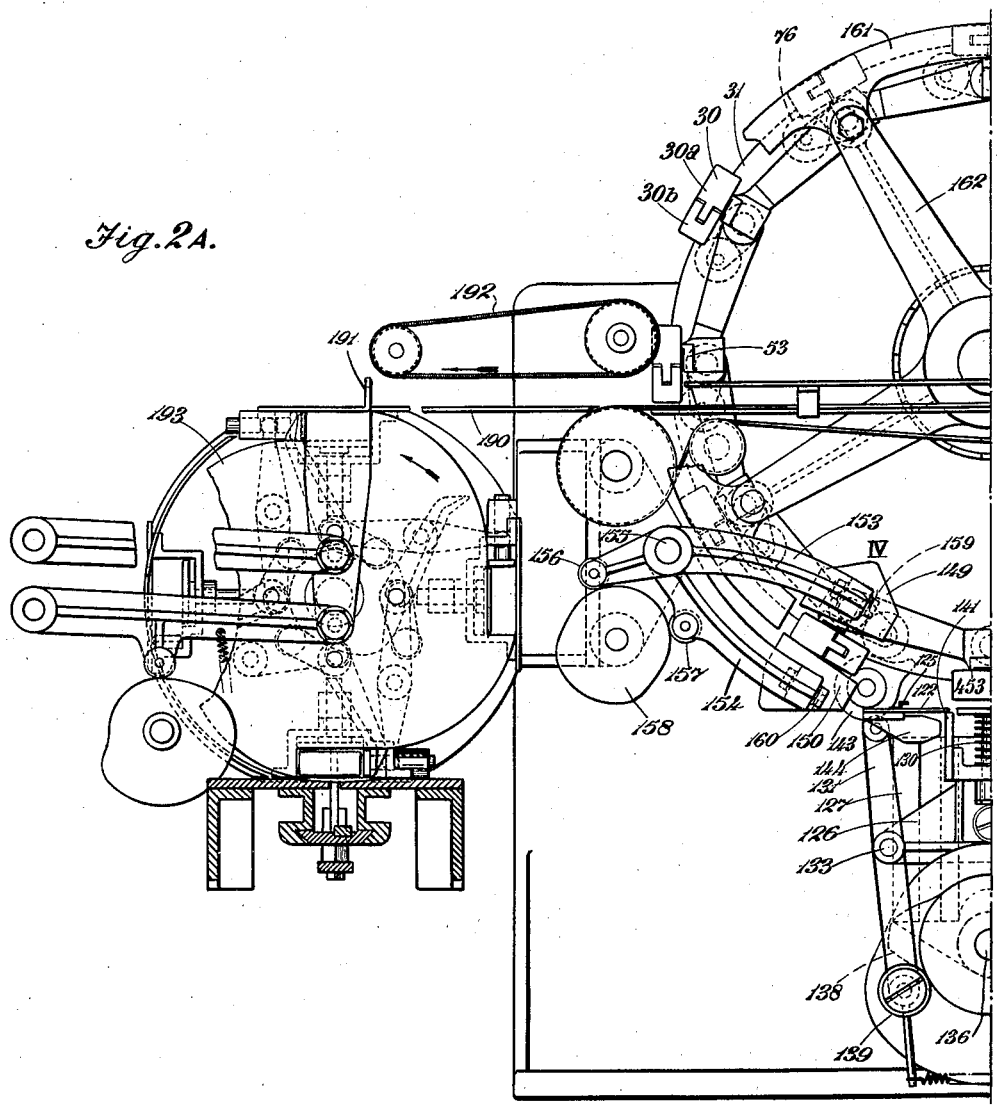
Figures 2a and 2b show Figure 2 drawn to an enlarged scale.

Referring to Figures 1 and 2, a plurality of mandrels 30 are supported by carrier 31 mounted for rotation about the axis of a shaft 32. Each of the mandrels 30 is divided into two parts 30a and 30b, the part 30a being rigidly connected with the carrier 31 whilst the part 30b is pivoted thereto for a purpose which will hereinafter appear.

The carrier 31 rotates in the direction of the arrow shown in Figure 2. Rotation of the carrier 31 is effected by a Geneva drive shown in Figure 3. A driven member 33 provided with radial slots 34 is bolted to the carrier 31 and a register 35 is provided between successive slots 34. The driven member 33 is intermittently moved by a roller 36 which is freely rotatable on a support 37 and enters each of the slots in succession. The support 37 is secured to a shaft 38 which shaft is continuously rotated. As can be seen from Figure 3, the support 37 is provided with an enlarged boss 39 which co-operates with the register 35, a segmental part 39a of the boss being cut away to enable the driven member 33 to rotate when the cut away portion of the boss 39 is adjacent the member 33.

A Geneva mechanism of this kind is well known, but it is found that in practice such mechanism is frequently noisy in operation due to some clearance which is necessary between the register and the co-operating part 39 of the support 37.

In order to reduce the noise the place at which the boss 39 co-operates with a register 35 is arranged to be submerged in oil contained in a container 40. The oil forms a film on the surface of the register 35 and the boss 39 and reduces the space, which space it will be appreciated is very small, between the register and the co-operating surface of the boss 39. The shaft 38 is, as previously stated, continuously driven and is driven from the main drive of the machine.

Each mandrel, as will be seen from the drawings, is of substantially oblong rectilinear cross-section and is moved into engagement with a length of wrapping material which is fed into the path of the mandrel.

Figure 2B:
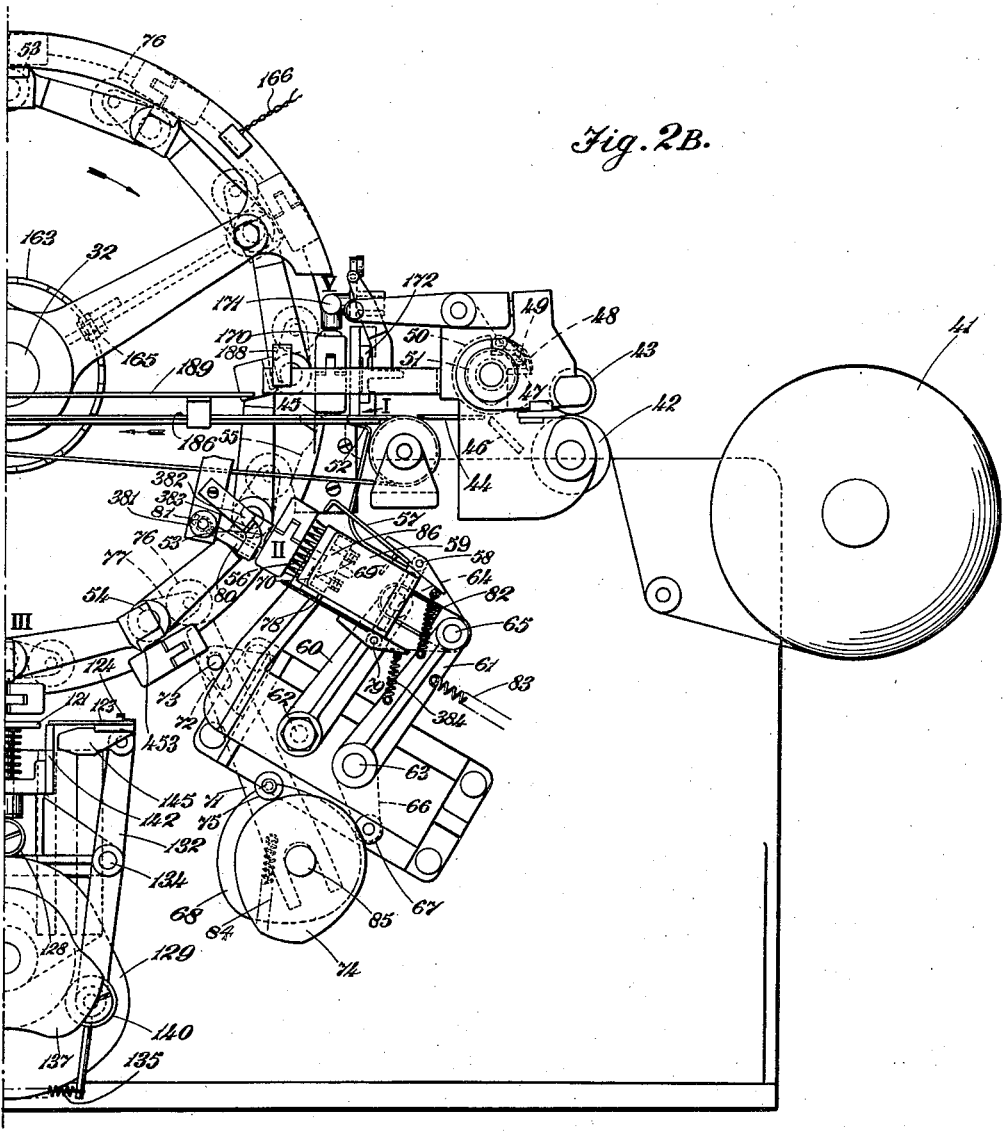

For convenience the various positions at which operations are performed to fold a wrapper about a mandrel will be referred to as "stations." The first station indicated by the reference I is the station at which a mandrel first engages with a wrapper (see Figures 2b and 9). Wrapping material is fed from a reel 41 between feeding rollers 42 and 43 and on to a support 44. The support 44 is provided with a slot 45 through which a mandrel passes, thus forming the wrapper into a U shape about the leading narrow face of the mandrel (see Figure 10). When a length of wrapping material has been fed on to the support 44, a wrapper is severed from the web by means of a fixed knife 46 and a rotatable knife 47. A stripping element 48 is pivoted at 49 to the carrier 50 on which the knife 47 is mounted and the stripping element is operated by a fixed cam 51 to deflect the severed edge of the wrapping material away from the knife edge after a cutting operation. The mandrel moves through the slot 45 forming the wrapping material into a U about the leading narrow face of the mandrel, one limb of the U being shorter than the other as can be seen from Figure 10. The longer limb of the U is engaged by a guide 52 and is supported thereby during the movement of the mandrel and wrapper to station II. A pressing element 53 is arranged to co-operate with each mandrel, the pressing element being pivoted about the axis of a spindle 54 supported by the carrier 31 and first arranged to engage the shorter limb of the U and to hold the shorter limb against a broad face of a mandrel. This movement of the presser element 53 is effected by a fixed member 55. As the presser element passes the member 55 a roller 76 described below engages with the member 55. The longer limb of the U formed by the wrapping material is, whilst the mandrel is positioned at station II, held against a broad face of the mandrel by a brush 56 (see Figure 11).

Whilst the mandrel is at station II the longer limb of the U formed by the wrapping material is folded about the narrow face opposite that narrow face of the mandrel about which the base of the U is formed and into overlapping engagement with the shorter limb of the U (see Figure 12). These folding operations are effected by means of a folding element 57 pivoted at 58 to a carrier 59. The carrier 59 is supported for movement towards and away from the mandrel at station II by a pair of parallel links 60 and 61. The links 60 and 61 are pivoted at 62 and 63 respectively to the frame of the machine and at 64 and 65 to the carrier 59. The link 61 is also connected with an arm 66 carrying a cam follower 67 which co-operates with a cam 68. The cam 68 causes the parallel links to be rotated about their pivots 62 and 63 thereby effecting movement of the carrier 59 and the folding operations above referred to. As the carrier 59 is moved towards a mandrel position at station II the folding element 57 engages the trailing end of the longer limb of the U of wrapping material and folds the trailing end against the narrow side face of the mandrel opposed to that about which the base of the U is formed. Continued movement of the carrier 59 causes a projection 69 on the folding element 57 to engage with an abutment 70 secured to the frame of the machine. The abutment 70 comprises a screw capable of adjustment and provided with a locking nut to hold the screw in position after it has been set. Engagement of the projection 69 with the abutment 70 causes the folding element 57 to turn about its pivot 58 thereby folding the upstanding trailing end of the wrapper into engagement with the shorter limb of the U as shown in Figure 12.

The folding element 57 is moved in timed relationship with the pressing element 53, the arrangement being such that the pressing element 53 is raised out of engagement with the shorter limb of the U just prior to the folding element 57 causing the trailing end of the wrapper to be folded into engagement therewith. The pressing element 53 is moved out of engagement with the shorter limb of the U by a lever 71 having a slot 72 which co-operates with a fixed pin 73. The lever 71 is guided by the pin 73 and slot 72 and is reciprocated by a cam 74 which co-operates with a cam follower 75 carried by the lever 71. The end of the lever 71 engages with a roller 76 supported by an arm 77 secured to the spindle 54. Engagement of the lever 71 with the roller 76 causes the presser element 53 to turn about the axis of the spindle 54 and out of engagement with the shorter limb of the wrapping material.

A further folding element 78 is pivoted at 79 to the carrier 59 and is movable therewith, being arranged to engage the base of the U as the carrier 59 is moved towards the mandrel and so to hold that part of the wrapper in position about the mandrel whilst the folding element 57 is operative to fold the trailing limb of the U.

The shorter limb of the U when the presser member 53 is moved out of engagement therewith is prevented from moving for any substantial distance away from the broad face of a mandrel against which it is folded by a guide 80 pivoted at 81 and controlled by a spring 381 and a stop 382 with which a foot 383 secured to the guide 80 engages. Before the folding element 57 disengages the flap folded thereby, the presser member 53 is caused to engage the overlapping portions of the wrapping material and to hold them in position about the mandrel. As the mandrel is moved away from station II the presser member 53 rotates the guide 80 about its pivot so as to permit the forward movement of the presser member 53. The guide 52 is secured to the carrier 59 for movement therewith and is arranged to bridge the slot 45 whilst folding operations are being effected at station II and whilst a further wrapper is being fed on to the support 44. The guide 52, therefore, prevents the end of a wrapper from entering the slot 45 before the wrapper is engaged by a mandrel and moved thereby through the slot.

The folding elements 57 and 78 are controlled by springs 82 and 384 respectively as can be seen from Figure 2.

A spring 83 maintains the cam follower 67 in engagement with the cam 68 and a spring 84 maintains the cam follower 75 in engagement with the cam 74. The cams 68 and 74 are mounted for rotation with a shaft 85 and it will therefore be seen that the operation of the presser member 53 and the folding elements 57 and 78 is effected in timed relationship.

After a folding operation has been effected by the folding elements 57 and 78, the pressing member 53 is moved downwardly and engages the overlapping portions of the wrapper, holding them in position against the broad face of the mandrel before they are released by the folding elements 57 and 78.

The wrapper is so placed about the mandrel that it projects beyond the free end face thereof and when the carrier 59 is moved towards the mandrel, a further folding element 86 secured to the carrier 59 engages with the outwardly extending portion of the wrapper which projects beyond the end face of the mandrel from that side thereof which is opposed to the side against which the edges of the wrapper are overlapped and folds the projecting portion upwardly into engagement with the end face of the mandrel (see Figure 12).

The folding operations above described being completed, the mandrel is moved to station III at which the second wrapper or label is applied to the mandrel and is folded thereabout. During movement of the mandrel from station II to station III, the first-applied wrapper is held in position upon the mandrel by the presser member 53.

As can be seen from Figure 2, the mandrel when in position at station III has its broad faces arranged in substantially horizontal planes and the label is moved upwardly into engagement with the lower broad face of the mandrel. The second wrapper or label is positioned prior to its movement into engagement with the mandrel, on a support whose supporting surface is arranged below that of the support 44. It will be seen, therefore, that whilst the support 44 is arranged to dispose a wrapper in the path of a mandrel, the support for the second wrapper or label is adjacent the path of the mandrel, and the arrangement of the two wrapper supports is such that whilst the first wrapper is first engaged by a narrow side of the mandrel, the second wrapper is first engaged by a broad side of the mandrel adjoining the narrow side first engaged by the first wrapper.

The label comprising the second wrapper is fed from the bottom of a pile of labels contained in a magazine 88. The labels are fed from the bottom of the pile one at a time by a gripper element 89 comprising a suction tube connected with a suction pump. The suction tube is carried by a bell crank lever 90 pivoted at 91 and oscillated about the pivot 91 by a connecting arm 92 pivoted at 93 to a support 94 which is pivoted at 95 to the frame of the machine.

The support 94 carries a cam follower 96 (see Figure 4) which co-operates with a cam 97 to effect oscillation of the bell crank lever 90 about the pivot 91. The suction tube 89 due to the movement of the bell crank lever 90 draws the labels one at a time downwardly so that the leading edge of a label is engaged between an idler roller 100 and the surface of a positively rotated roller 98. An arm 99 also pivoted at 95 supports the roller 100 which co-operates with the surface of the roller 98 to feed the label forwardly to a pair of feed rollers 101, 102. The arm 99 also supports a cam follower 103 which co-operates with a cam 104 and moves the roller 100 in timed relationship with the suction tube 89 so as to engage and feed forwardly a blank at the correct time. The cam followers 96 and 103 are held in position against the surfaces of the cams 97 and 104 respectively by springs, not shown. The rollers 101 and 102 feed the label forwardly between rollers 105 and 106, the roller 106 projecting through a support 107 over which the label is fed.

Transfer elements 108 are arranged to transfer adhesive from a container 109 to the surface of rollers, not shown, which applies adhesive to the label, pressure rollers 87, see Figure 1, being provided to press the label against the adhesive applying rollers. A scraping element 110 is provided to remove surplus adhesive from the surface of the transfer element 108. The adhesive applying rollers apply adhesive to the label at desired positions so that when the label is folded about the mandrel the folds made in the label will be held in position.

After adhesive has been applied to the label the latter passes between a still further pair of rollers 111 and 112 and the rear edge of the label is engaged by pusher elements 113, pivoted at 114 and at 514 and caused to move in the direction of movement of the label by means of operating elements 115, 116, 117 and 118, the operating elements causing the pusher 113 to be rotated about the pivot 114 through the medium of a cam follower 119 secured to the element 118 and co-operating with a cam 120. The pusher element 113 by reason of the fact that it engages the rear edge of a label, positively locates the label in the required position on the support from which position it is moved into engagement with the mandrel disposed at station III.

The support for the label comprises a plate 121 and the upper surfaces of a pair of folding elements 122 and 123. Guide elements 124 and 125 are provided to guide the edges of the label in the direction of feeding thereof.

The plate 121 and the folding elements 122 and 123 are supported by a carrier 126 mounted in a slide 127. The carrier 126 has connected thereto a cam follower 128 which co-operates with a cam 129. A spring (not shown) maintains the cam follower in engagement with the cam 129. As can be seen from Figure 2, the plate 121 is movable relatively to the carrier 126, being slidably mounted therein and controlled by a spring 130.

The folding elements 122 and 123 are carried by supports 131 and 132 pivoted at 133 and 134 respectively. The lower ends of the supports are connected by a spring 135. The cam 129 is mounted on a shaft 136 on which shaft two further cams 137 and 138 are also mounted, the cams 137 and 138 being arranged to co-operate with cam followers 139 and 140 attached to the supports 131 and 132 respectively. By this means the folding elements 122 and 123 are operated in timed relationship with the plate 121 and with a pair of further folding elements 141 and 142 fixed to the carrier 126.

After a label has been placed in position on the support (see Figure 13) the carrier 126 moves upwardly, thus moving the label upwardly and into engagement with the underside of the first wrapper which is formed about the mandrel.

When the plate 121 engages the underside of the mandrel continued movement of the carrier causes the spring 130 to be depressed, the plate thereby holding the wrapper against the underside of the mandrel whilst the sprung folding elements 141 and 142 fold the wrapper upwardly against the vertical sides of the mandrel (see Figure 14). The upward movement of the carrier is such that the folders 141 and 142 cease to move when the upper portions thereof are substantially flush with the upper surface of the mandrel, and at this time the cams 137 and 138 cause the folding elements 122 and 123 to move inwardly, folding the upstanding portions of wrapping material downwardly in overlapping engagement against the upper surface of the mandrel (see Figure 15).

The pressing element 53 which is holding the overlapping portions of the first wrapper against the upper surface of the mandrel is moved away therefrom as the folding elements 122 and 123 become operative in order to permit the upstanding portions of the second wrapper to be overlapped against the upper surface of the mandrel. The cams 137 and 138 are so set that the folding element 122 is operative slightly in advance of the folding element 123 so that that portion of the wrapper which is folded downwardly by the folding element 123 overlaps that portion which is folded by the folding element 122. The portion of wrapping material which is folded downwardly by the folding element 123 has been supplied with adhesive by the mechanism above described so that when the upstanding portions of the wrapper are folded downwardly into overlapping engagement, they are caused to adhere to each other by reason of the adhesive. As the folding elements 122 and 123 are again moved outwardly by the cams 137 and 138 the presser member 53 is again moved into engagement with the mandrel and presses against the overlapping portions of the second wrapper. The presser member 53, as can be seen from the drawings, is provided with a slight projection 453 on the side thereof which engages the wrapper. The projection 453 is so arranged as to engage the wrapper directly above the position at which adhesive is placed between the overlapping parts thereby causing better adherence of the overlapping parts.

The movement of the presser member 53 when the latter is operative at station III is effected by a cam 143 which co-operates with the roller 76. The cam 143 is moved in timed relationship with the cams 129, 137, 138.

A pair of further folding elements 144 and 145 are connected with the folding elements 122 and 123 respectively for movement therewith. The folding elements 144 and 145 are arranged to form narrow side folds 146 and 147 in those portions of the first and second wrapper which project beyond the end of the mandrel. As the folding elements 122 and 123 are moved inwardly the folding elements 144 and 145 move inwardly also, thereby folding the projecting narrow portions of the first wrapper against the end face of the mandrels.

The first wrapper comprises a metal or other foil wrapper preferably lined with a paper liner on that side which is to engage the cigarettes when the latter are inserted into the formed wrapper, whilst the second wrapper or label usually comprises a paper wrapper. Whilst it is a simple matter to secure the folds of the paper wrapper together by adhesive, it is considerably more difficult to secure folds formed in the foil wrapper either when the adjacent folds to be secured are both foil, or when one fold is foil and the other paper. By reason of the fact that the flap 148 is folded beneath the narrow end flaps 146 and 147 it is possible more easily to secure the end folds of the wrapper, because when the further folding operations about to be described are completed, the adjacent folded portions of material which are to be secured to hold the end folds in position are folds formed from the paper wrapper.

After the folding operations above described have been completed, the carrier 31 is moved a further stage and the mandrel is moved to station IV. At station IV a pair of folders 149 and 150 are arranged to form the final closure flaps 151 and 152 respectively. The folders 149 and 150 are pivoted to arms 153 and 154 respectively, each of the arms 153 and 154 being pivoted at 155. Cam followers 156 and 157 connected with the arms co-operate with a cam 158, which cam causes the arms to be operated one after the other to perform the folding operations. The cam followers 156 and 157 are held against the cam 158 by springs (not shown). The folding element 149 is first operated and moves downwardly thereby folding the closure flap 151, which flap comprises wrapping material from both the first and the second wrappers arranged so that the second wrapper is outermost, against the end face of the mandrel. The folder 150 then moves upwardly, folding the closure flap 152, comprising the projecting portion of the second wrapper, upwardly into engagement with the closure flap 151 (see Figure 16).

Since the flap 148 has been folded at a previous time, that is, by the folder 86, the flap 152 comprises only a portion of the second wrapper and the engaging portions of the closure flaps 151 and 152 are therefore both paper surfaces. Adhesive which was applied to the second wrapper in the manner above described secures the closure flaps 151 and 152.

The folding elements 149 and 150 are pivoted at 159 and 160 to the arms 153 and 154 respectively, the arrangement being such that during the folding operation the pivoted folders 149 and 150 are urged against the end of the mandrel by springs (not shown).

As can be seen from the drawings, each of the folding elements 149 and 150 is also shaped so that one corner or side of the projecting portion of the wrapper which forms a closure fold is engaged by the folding element before the whole of the closure flap is engaged by the folding element. By this means the closure flaps are folded about the end face of the mandrel in a manner such that they are tightly formed thereabout. The folding element 150 is timed relatively to the movement of the mandrel that the fold 152 is retained in position by the element 150 until the fold 152 is engaged by a presser element 161 referred to below.

The formation of the empty packet, which has the form shown in Figure 17, is now completed and the packet is carried by the mandrel through a number of idle stations not enumerated, to a station V which is adjacent station I. At station V an empty packet is stripped from the mandrel about which it has been formed.

Whilst a finished packet is being moved from station IV to station V the end folds of the packet are engaged by a presser element 161 mounted on a three-armed support 162 which support is slidably mounted on the shaft 32 and urged by a spring 164 towards a cam 163 secured to the carrier 31, see Figure 4. The cam 163 is in the form of a circular rack and projections 165 on the support 162 engage with the cam 163, thereby causing the presser bar 161 to be moved into and out of engagement with the end folds of the packets. To prevent undue rubbing of the end folds of the packets the cam 163 is arranged to move the presser bar 161 out of engagement with the end folds whilst the mandrels are moving from one position to another. The bar 161 is heated in order further to facilitate the drying of the adhesive securing the end folds of the packets. Heating of the bar is effected by a resistance coil, not shown, which coil is included in the bar 161 and connected with a source of electrical power by means of wires 166. The pressure exerted by the bar 161 against the end folds may be adjusted as desired.

The pressing elements 53 also are provided with electrical heating elements, not shown, and are connected with a source of electrical power so that the drying of the adhesive between the overlapping portions of the second wrapper which are held in position by the presser members 53 may be facilitated.

As a mandrel approaches station V a roller 167 secured to the pivoted portion of the mandrel 30b engages with a fixed cam 168, thus causing the pivoted portion 30b to move inwardly, compressing the spring 169 and reducing the size of the mandrel. When, therefore, the mandrel arrives at the station V the packet is of greater internal cross-section than the cross-section of the mandrel, and this facilitates the removal of the packet from the mandrel. The packet is removed from the mandrel by means of a pair of suction cups 170 (see Figures 1, 2 and 5) secured to a support 171 which is pivoted to a bracket supported by a carrier 172. The carrier 172 is slidable lengthwise of the mandrel and is moved by an arm 173 pivoted at 174 and a connecting link 175 connecting the arm 173 with the slidable carrier 172. The arm 173 is oscillated about its pivot 174 by a link 176, one end of which is eccentrically connected with a rotatable disc 177, the other end being connected with a pin 178 arranged to move in a slot 179 formed in the arm 173.

At each end of the stroke of the carrier 172 there is provided a stop, one stop being indicated by the reference numeral 180, the other by the reference numeral 181. As the carrier 172 approaches each end of its stroke, the support 171 is caused to turn about its pivot by reason of the engagement with a stop 180 or 181 of a projection 372 on an arm 371 pivoted at 771 to the carrier 172. A further arm 772 is secured to the pivot of the support 170 and is parallel with the arm 371 and connected with the arm 371 by a link 773. By this means when, due to the projection 372 engaging a stop 180 or 181, the arm 371 is turned about its pivot 771 a corresponding movement is imparted to the arm 772, thus causing the support 171 to be moved upwardly or downwardly according to whether the projection 372 engages the stop 181 or the stop 180.

At the end of the stripping action, that is, when a packet which has been removed from a mandrel by the suction cups is released from the grip of the suction cups, the support is moved upwardly due to the engagement of the projection 372 with the stop 181, whilst at the end of its return stroke when the support is again in position above a mandrel from which a packet is to be stripped, engagement of the projection 372 with the stop 180 causes the support to be moved downwardly so that the suction cups 170 engage with the upper narrow side of the packet which is about the mandrel. The support 171 is provided with an aperture which communicates with the suction cups 170 and a flexible pipe 182 connects the support 171 with a valve 183, which valve is connected with a suction pump diagrammatically indicated at 184. The valve 183 is operated by a pin 185 carried by the link 175 and arranged to depress the valve at the end of the stripping stroke of the carrier 172 thereby cutting off the suction so that the cups 170 release the packet which then falls on to the surface of a pair of conveyor bands 186. Connection between the link 175 and the arm 173 is effected by a screw 373 which is secured in the arm 173 and has a shank slidable in a slot 374 formed in the link 175. An adjustable screw 375 is locked in position in a bracket 376 secured to the support 172 and is arranged to engage a fixed stop 377. A spring 378 is provided normally to maintain the screw 373 in the position shown in Figures 1 and 1a.

When, however, the screw 376 engages the stop 377 relative movement is effected between the support 172 and the link 175 whereby the support remains stationary, thus permitting the suction cups properly to grip a packet to be removed from a mandrel before the support is again caused to move towards the conveyor bands 186.

An empty packet is deposited upon the bands 186 in a manner such that the packet is stood upon one of its narrow sides. The packet deposited on the bands is positioned between two guides 187 and 188 which are arranged above the bands 186, the guide 188 being disposed at a greater distance above the bands 186 than is the guide 187. Movement of the bands 186 in the direction of the arrow (see Figure 2) causes the empty packet positioned between the guides 187 and 188 to engage with the guide 188 and the continued movement of the bands 186 causes the portion of the packet which engages the bands to be moved forwardly while the forward movement of the upper part of the packet is prevented by the guide 188. The empty packet is therefore tilted against the guide 187 and continued movement of the bands 186 causes the packet to slide down the guide 187 and beneath the guide 188 so that the empty packet is arranged upon a broad face thereof with the seam uppermost on the bands 186. Guides 189 are provided to prevent undue movement of the packets transversely of the direction of movement of the bands 186. As can be seen from Figure 2, the bands 186 are of a length such that a number of empty packets are, during the operation of the machine, positioned upon the bands at one time, and this arrangement permits the machine minder to inspect the packets being carried by the bands 186, so that should a packet not be properly formed the machine minder can remove the defective packet and replace it with a good packet which has been made at some previous time. By this means wastage on the machine is reduced, because improperly formed packets are not filled with cigarettes but are removed prior to the filling operation. The bands 186 deliver the empty packets on to a stationary support 190, the packets being moved along the support by reason of successive packets engaging with each other and pushing each other along. The packets are moved over the suport 190 against a stop 191 by means of which they are aligned for insertion into pockets of a conveyor 193. The closed ends of the packets are located against the adjacent guide 189 by a spring band or bands 192 which engage with the upper surfaces of the packets. The bands 192 are inclined to the direction of movement of the packets and engage the upper surface of a packet at a position adjacent the closed end of the packet, which end of the packet it will of course be appreciated is the stronger, due to the folds formed therein. The band 192 moves in the direction of the arrow shown in Figure 2, and the effect of the band 192 is to urge the packets towards the guide 189.

What we claim as our invention and desire to secure by Letters Patent is:

1. In a packet making machine, a mandrel of substantially oblong cross-section movable in one direction through a predetermined path, two supports each to receive a wrapper to be folded about the mandrel, the wrapper first to be engaged by the mandrel being received by one of said supports positioned in the path of the mandrel so that the wrapper received by the support is engaged by a narrow side of the mandrel, guides partly to fold the wrapper about the mandrel, means to move the second wrapper to be engaged by the mandrel from its support into engagement with the first wrapper and against a broad side of the mandrel and means to overlap opposed edges of each of the wrappers.

2. In a packet making machine, a mandrel of substantially oblong cross-section revolvable bodily in one direction about a fixed axis, two supports each to receive a wrapper to be folded about the mandrel, said supports having supporting surfaces arranged one above the other in substantially parallel planes, one of said supports being arranged to support a wrapper in the path of the mandrel so that the wrapper is engaged by a narrow side of the mandrel during movement thereof, the other support being arranged to support a wrapper at a position adjacent the path of the mandrel, means to move the last-mentioned wrapper towards a broad side of the mandrel adjoining that side which is first engaged by the first-mentioned wrapper and means to overlap opposed edges of each of the wrappers.

3. In a packet making machine, a mandrel of substantially oblong cross-section movable in one direction through a predetermined path, two supports each to receive a wrapper to be folded about the mandrel, the wrapper first to be engaged by the mandrel being received by one of said supports positioned in the path of the mandrel so that the wrapper received by the support is engaged by a narrow side of the mandrel, guides partly to fold the wrapper about the mandrel, means to move the second wrapper to be engaged by the mandrel from its support into engagement with the first wrapper and against a broad side of the mandrel, each of said wrappers extending beyond an end face of the mandrel, means to overlap opposed edges of each of the wrappers to form a tubular wrapper, and means to close that open end of the tubular wrapper which extends beyond said end face of the mandrel.

4. In a packet making machine, a mandrel movable in a predetermined path, a support for a wrapper positioned in the path of the mandrel, means to fold the wrapper into U form about the leading face of the mandrel in a manner such that one limb of the U is longer than the other and trails beyond the rear face of the mandrel, mechanism to fold the trailing portion of the longer limb about said rear face and into overlapping engagement with the shorter limb, said mechanism comprising a carrier movable relatively to the mandrel and supported for movement by parallel links moved in timed relationship with the mandrel, a folding element pivoted to the carrier, a projection on the folding element, an abutment to arrest said projection thereby causing rotation of the folding element about its pivot and means to rotate the folding element about its pivot in a reverse direction when said projection ceases to engage the abutment and means operative during the folding of the trailing portion of said longer limb to prevent substantial movement of the shorter limb away from that face of the mandrel against which it is folded.

5. In a packet making machine, a mandrel movable in one direction through a predetermined path comprising a plurality of stations and mechanism at one said station to move a wrapper against the mandrel and to fold the wrapper thereabout with opposed edges of the wrapper overlapping and a part of the wrapper extending beyond an end face of the mandrel, said mechanism comprising a carrier movable relatively to said mandrel, folding elements pivoted on said carrier, the upper surfaces of the folding elements providing a support for a part at least of a wrapper to be folded about the mandrel, a member supported by the carrier and arranged to fold a wrapper into U form about the mandrel, a clamping member supported by and movable relatively to the carrier and operative to clamp the base of the U formed by the wrapper against the mandrel, means to move the folding elements one towards the other in succession to fold the upstanding limbs of the U formed by a wrapper into overlapping relationship against the mandrel, and further folding elements supported on said carrier and operative in a plane substantially at right angles to that in which the limbs of the U are overlapped, to fold portions of the wrapper which extend beyond said end face of the mandrel against said end face.

6. In a packet making machine, a mandrel, folding elements to form a tubular wrapper about the mandrel and to close one end of the wrapper, a stripping element connected with a source of suction and arranged to engage a side of a packet formed about the mandrel and means to effect relative movement between said stripping element and the mandrel to remove the packet therefrom, said means including a lost-motion device arranged to provide a period of rest for the stripper element after the latter has engaged a packet whereby air may be substantially completely exhausted from the stripper element before the latter is caused to remove the packet from the mandrel.

7. In a wrapping machine, a mandrel about which a wrapper is formed, a carrier supported for reciprocation lengthwise of the mandrel, a sucker pivoted to the carrier for movement therewith and means to rotate the sucker about its pivot so as to cause the sucker to engage and grip a wrapper on the mandrel and to release the wrapper after movement of the carrier has caused the wrapper to be removed from the mandrel.

8. In a wrapping machine, a mandrel about which a wrapper is formed, a carrier supported for reciprocation lengthwise of the mandrel, a sucker pivoted to the carrier for movement therewith, means to rotate the sucker about its pivot so as to cause the sucker to engage and grip a wrapper on the mandrel, a suction pump, a connection between the sucker and the suction pump and forming part of said connection, a valve operative in timed relationship with said carrier to permit access of atmospheric air to said connection.

9. In a wrapping machine, a mandrel about which a wrapper is formed, a carrier supported for reciprocation lengthwise of the mandrel, a sucker pivoted to the carrier for movement therewith, a pair of stops each arranged in the path of said sucker and one adjacent each end of the stroke of said carrier whereby continued movement of the carrier after movement of the sucker in the direction of movement of the carrier has been arrested, causes rotation of the sucker about its pivot, a suction pump, a connection between the sucker and the suction pump and forming part of said connection, a valve operative in timed relationship with said carrier to permit access of atmospheric air to said connection.

10. In a wrapping machine, a mandrel about which a wrapper is formed, said mandrel comprising a fixed and a movable part, means to urge said movable part away from the fixed part whilst a wrapper is being formed about the mandrel, means to move the movable part towards the fixed part after a wrapper has been formed about the mandrel, a carrier supported for reciprocation lengthwise of the mandrel, a sucker pivoted to the carrier for movement therewith and means to rotate the sucker about its pivot so as to cause the sucker to engage and grip a wrapper on the mandrel and to release the wrapper after movement of the carrier has caused the wrapper to be removed from the mandrel.

11. In a wrapping machine, a movable endless conveyor surface, a pair of guides arranged transversely to and above the conveyor surface one in advance of the other in the direction of movement of the conveyor, that guide which is foremost being at a greater distance above the conveyor than the other guide, and means to deposit a wrapper upon a narrow side thereof on the conveyor surface and between said guides whereby movement of the conveyor causes the wrapper to be engaged by said guides and laid on a broad side on the conveyor.

JOHN WALKER CHALMERS.
DAVID BLEWES KIDD.